United States Patent
Ono et al.

(10) Patent No.: US 7,338,987 B2
(45) Date of Patent: Mar. 4, 2008

(54) FRICTION MATERIAL COMPOSITION AND FRICTION MATERIAL USING THE SAME

(75) Inventors: Manabu Ono, Hitachi (JP); Teruyuki Nagayoshi, Hitachi (JP); Mitsuhiro Inoue, Tokyo (JP); Hiroki Morozumi, Isehara (JP); Takahiro Mibe, Yamato (JP); Yukio Takai, Tochigi (JP)

(73) Assignees: Hitachi Chemical Co., Ltd., Tokyo (JP); Nissan Motor Co., Ltd., Yokahama-Shi (JP)

( * ) Notice: Subject to any disclaimer, the term of this patent is extended or adjusted under 35 U.S.C. 154(b) by 525 days.

(21) Appl. No.: 10/849,845

(22) Filed: May 21, 2004

(65) Prior Publication Data

US 2004/0262104 A1    Dec. 30, 2004

(30) Foreign Application Priority Data

May 22, 2003   (JP) .............................. 2003-144359

(51) Int. Cl.
*D04H 1/00*   (2006.01)
*C08L 83/06*   (2006.01)

(52) U.S. Cl. ....................... 523/149; 523/150; 523/152; 523/155; 523/156

(58) Field of Classification Search ................ 523/149, 523/150, 152, 155, 156
See application file for complete search history.

(56) References Cited

U.S. PATENT DOCUMENTS

| | | | |
|---|---|---|---|
| 3,003,919 A | 10/1961 | Broge | |
| 3,584,718 A | 6/1971 | Schiefer et al. | |
| 5,693,239 A | 12/1997 | Wang et al. | |
| 6,220,404 B1 * | 4/2001 | Hara et al. .............. | 188/251 A |
| 6,355,601 B1 * | 3/2002 | Takenaka et al. ........... | 508/108 |
| 2004/0247847 A1 * | 12/2004 | Nagayoshi et al. ...... | 428/292.1 |

OTHER PUBLICATIONS

Communication and European Search Report mailed Oct. 6, 2004, for No. EP 04 01 2240.

* cited by examiner

*Primary Examiner*—Katarzyna Wyrozebski
(74) *Attorney, Agent, or Firm*—Antonelli, Terry, Stout & Kraus, LLP.

(57) ABSTRACT

There are disclosed a friction material composition which comprises a fibrous material except for asbestos, an inorganic friction regulator, an organic friction regulator and a binder, part of the inorganic friction regulator is α alumina and γ alumina in combination, a weight ratio of the α alumina and the γ alumina, α alumina:γ alumina, is in the range of 1:20 to 1:5, and part or whole part of the binder is a silicon-containing phenol resin, and a friction material obtained by molding the friction material composition under heating and pressure.

18 Claims, 1 Drawing Sheet

FRICTION MATERIAL COMPOSITION AND FRICTION MATERIAL USING THE SAME

BACKGROUND OF THE INVENTION

1. Field of the Invention

The present invention relates to a friction material composition suitable for the production of friction materials such as disc brake pads or brake linings to be used to brake cars, and a friction material using the same.

2. Description of the Related Art

Friction materials such as disc brake pads and brake linings are used to braking cars. Friction materials mainly used at present are Non-Asbestos Organic (hereinafter abbreviated to as "a NAO material") series disc brake pads, which, as disclosed in Japanese Unexamined Patent Publications No. Hei. 2-132175A and No. Hei. 6-184525A, contain a friction regulator including fibrous materials such as Aramid fiber, inorganic fiber, etc., cashew dust, graphite and the like to cause less squeal noise or less groan noise.

However, required performances to the brake in recent years are tend to be increased more and more, in particular, further improvement in effectiveness of the braking and noise and vibrations (groan noise, squeal noise, vibrations, etc.) are required. In the disc brake pads comprising the above-mentioned NAO material, it is required to improve effectiveness of braking under high load, high speed, high temperature, etc.

Also, when a driver is to decrease a speed of a car by pedaling a brake pedal, if there is a tendency of increasing effectiveness of braking with a lapse of a braking time (hereinafter referred to as "a friction coefficient ($\mu$) build up") even when a pedaling power is made constant, it is preferred since the driver feels secure.

However, when a case in which, for example, braking is carried out with a constant pedaling powder from an automobile speed of 50 km/h is considered, it is preferred to exist $\mu$ build up during braking from a car speed of 50 km/h to about 20 km/h. On the other hand, during a car speed of 20 km/h to immediately before stop of 0 km/h, the $\mu$ build up is considered to be preferably moderate or none in view of expecting inhibition of occurrence of groan noise or squeal noise.

Here, there is a means to add a polishing agent having higher Mohs' hardness to the conventional disc brake pad comprising a NAO material to obtain $\mu$ build up. In such a case, the $\mu$ build up continues immediately before stop, so that there is a tendency of easily occurring groan noise or squeal noise.

Moreover, one of the problems in recent years with regard to the above-mentioned noise and vibrations, when an automobile is allowed to stand for more than several hours and braking is carried out after the brake was cooled to an atmospheric temperature and moisture-adsorbed, effectiveness of the brake is easily increased by braking with the initial several times (hereinafter referred to as "$\mu$ increase after allowing to stand"). At that time, there are cases in which squeal noise occurred (hereinafter referred to as "cold squeal noise"), and this is required to be improved.

In FIG. 1 and FIG. 2, $\mu$ build up is shown in the relationship between a braking time and $\mu$. Of these, FIG. 1 shows $\mu$ build up of a conventional product, and FIG. 2 shows $\mu$ build up in an ideal form. In both of FIGS. 1 and 2, increase in $\mu$ relative to a braking time is observed, but in FIG. 1, $\mu$ build up continues immediately before stop, and there are tendency of easily causing groan noise or squeal noise. To the contrary, in FIG. 2, during an automobile speed of 20 km/h to immediately before stop of 0 km/h, the $\mu$ build up shows moderate behavior and occurrence of groan noise or squeal noise is a little.

SUMMARY OF THE INVENTION

The present invention is to provide a friction material composition which is less lowered in effectiveness under high load, high speed, high temperature, etc., excellent in stability of $\mu$, fading resistance and $\mu$ build up, causing less occurrence of cold squeal noise by controlling increase in $\mu$ after allowing a car for a long time, and suitable for a friction material.

The present invention is also to provide a friction material composition particularly excellent in stability of $\mu$, fading resistance and $\mu$ build up, and suitable for a friction material, among the invention of Claim 1.

The present invention is further to provide fiction materials excellent in stability of $\mu$, fading resistance and $\mu$ build up, and causing less occurrence of cold squeal noise.

The present invention relates to a friction material composition which comprises a fibrous material except for asbestos, an inorganic friction regulator, an organic friction regulator and a binder, part of the inorganic friction regulator is $\alpha$ alumina and $\gamma$ alumina in combination, a weight ratio of the $\alpha$ alumina and the $\gamma$ alumina ($\alpha$ alumina:$\gamma$ alumina) is in the range of 1:20 to 1:5, and part or whole part of the binder is a silicone-containing phenol resin.

Also, the present invention relates to a friction material composition comprising $\alpha$ alumina and $\gamma$ alumina in a total amount thereof being 1 to 10% by weight based on the whole content of the friction material composition.

Moreover, the present invention relates to a friction material obtained by molding the above friction material composition under heating and pressure.

Furthermore, the present invention relates to a friction material in which the above-mentioned friction material is a disc brake pad or brake linings.

DESCRIPTION OF THE PREFERRED EMBODIMENTS

Figure 1:
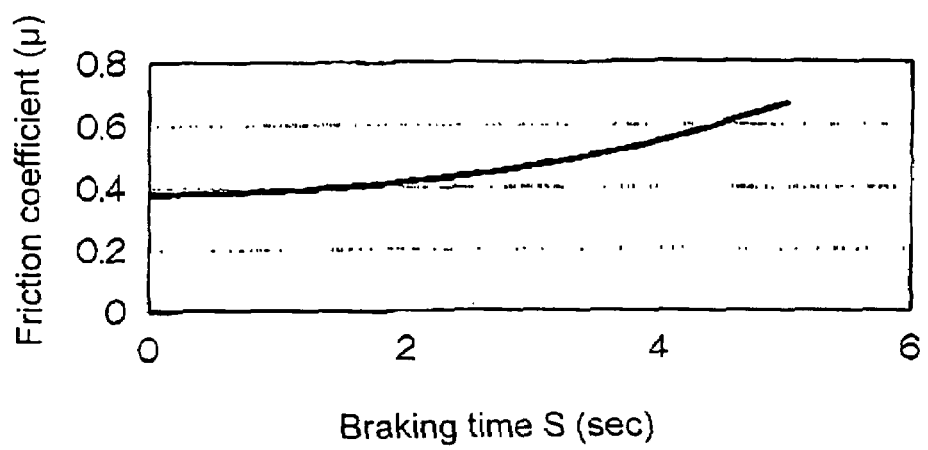
FIG. 1 is a graph showing $\mu$ build up of the conventional material with the relationship between a braking time and $\mu$.
Figure 2:
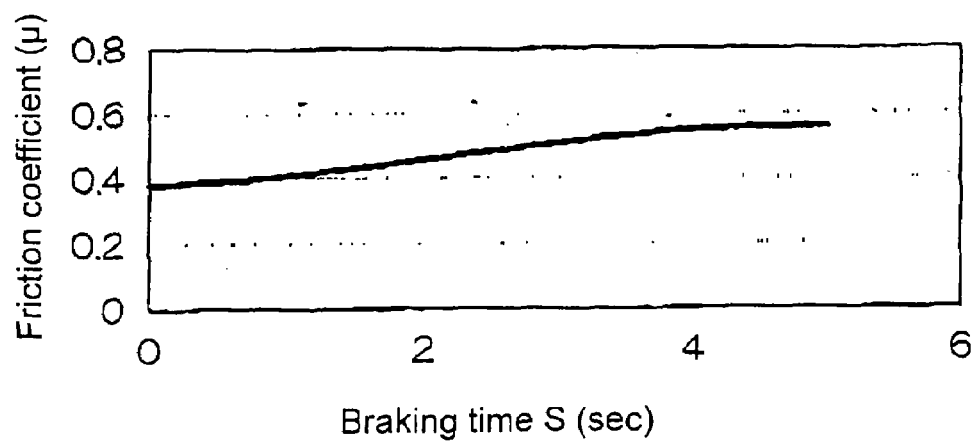
FIG. 2 is a graph showing $\mu$ build up of an ideal material with the relationship between a braking time and $\mu$.

The friction material composition of the present invention comprises a fibrous material except for asbestos, an inorganic friction regulator, an organic friction regulator and a binder, and part of the inorganic friction regulator contains $\alpha$ alumina and $\gamma$ alumina. The weight ratio of the $\alpha$ alumina and the $\gamma$ alumina ($\alpha$ alumina:$\gamma$ alumina) is set in the range of 1:20 to 1:5, preferably 1:17 to 1:8, more preferably 1:15 to 1:10. If the weight ratio of the $\alpha$ alumina exceeds 1:5, build up of $\mu$ continues immediately before stop and squeal noise or low frequency groan noise is likely generated. On the other hand, if the ratio of the $\alpha$ alumina becomes less than 1:20, then, build up of $\mu$ tends to be insufficient.

A total content of the $\alpha$ alumina and the $\gamma$ alumina is preferably in the range of 1 to 10% by weight based on the total content of the composition, more preferably in the range of 2 to 9%, further preferably in the range of 3 to 8% by weight. If the total content thereof is less than 1% by weight, effectiveness of braking under high load, high speed, high temperature, etc. is lowered, and fading resistance tends to be worsened, while if it exceeds 10% by weight, squeal noise or groan noise tends to be easily generated. The $\alpha$ alumina to be used in the present invention may include, for example, corundum and having a lattice constant a=5.14 Å, and the $\gamma$ alumina to be used in the present invention may include, for example, active alumina, that has a spinel type structure with a lattice defect and has a lattice constant a=7.75 to 8.08 Å.

In the present invention, it is one of the characteristic features that part or whole part of the binder comprises a silicone-containing phenol resin. The phenol resin to be used in the present invention is a thermosetting resin obtained by condensing a phenol derivative and an aldehyde derivative in the presence of an acid or an alkali. When the silicone-containing phenol resin is not used, if the resulting friction material is, for example, a brake disc pad, a friction coefficient is greatly increased at a low speed after allowing to stand for a long time or under low speed-decreasing conditions (20 km/h, 0.2 G), whereby cold squeal noise frequently occurs. As the silicone-containing phenol resin, a phenol resin in which silicone oil is dispersed or modified with silicone oil, a phenol resin containing silicone rubber, etc. is preferably used. The silicone-containing phenol resin is preferably contained in the total composition in the range of 2 to 15% by weight, more preferably 4 to 13% by weight. As the silicone-containing phenol resin, for example, RX2325C (trade name, available from Mitsui Chemicals, etc. may be mentioned. When silicone oil is added to the phenol resin, an amount thereof is 1 to 20% by weight based on the whole amount of the silicone-containing phenol resin and when silicone rubber is contained in the phenol resin, an amount thereof is 1 to 30% by weight based on the same.

The material to be used in the present invention includes, in addition to the above-mentioned α alumina, γ alumina and silicone-containing phenol resin, conventionally known materials in the art, for example, fibrous materials such as copper fiber, bronze fiber, phosphor bronze fiber, Aramid fiber, acrylic fiber, carbon fiber, ceramic fiber, rock wool, potassium titanate fiber, calcium carbonate whisker, magnesium carbonate whisker, etc.; inorganic friction regulators such as barium sulfate, calcium carbonate, magnesium carbonate, calcium oxide, calcium hydroxide, vermiculite, mica, wollastonite, alumina other than α and γ, silica, zirconia, zircon, magnesia, iron oxide, iron sulfate, tin sulfate, antimony trisulfide, molybdenum disulfide, carbon black, corks, etc.; organic friction regulators such as various kinds of rubber powders, cashew dust, etc.; binders including thermosetting resins such as melamine resin, polyimide resin, furan resin, etc., and an elastomer-modified phenol resin, etc., and depending on necessity, metal powders such as copper powder, bronze powder, zinc powder, etc.

A content of the above-mentioned fibrous material is preferably 5 to 40% by weight, more preferably 10 to 35% by weight, further preferably 15 to 30% by weight based on the total amount of the composition in the point of mechanical strength, etc. A content of the inorganic friction regulator is preferably 20 to 80% by weight, more preferably 30 to 70% by weight, further preferably 40 to 60% by weight based on the total amount of the composition depending on the characteristics thereof. A content of the organic friction regulator is preferably 2 to 25% by weight, more preferably 4 to 23% by weight, further preferably 6 to 21% by weight based on the total amount of the composition in the point of an abrasion amount of a pair material. A content of the binder is preferably 2 to 15% by weight, more preferably 3 to 14% by weight, further preferably 4 to 13% by weight based on the total amount of the composition in the points of mechanical strength and wear resistance.

These materials are formulated so that the total composition becomes 100% by weight.

The friction material of the present invention can be prepared by mixing the above-mentioned materials (the friction material composition) uniformly, subjecting the mixture to provisional molding (i.e., a green compact), inserting the green compact and a backing plate into a mold, subjecting to molding by a molding method under heating and pressure, and then subjecting to a post-heating treatment, and, if necessary, by subjecting to a scorching treatment to remove an organic material on the surface of the molded product.

Incidentally, a heating temperature at the time of molding is preferably 130 to 170° C., more preferably 140 to 160° C. A pressure of the same is preferably 20 to 60 MPa, more preferably 30 to 50 MPa. A temperature for the post-heating treatment is preferably 180 to 300° C., more preferably 200 to 250° C. Also, the scorch treatment is carried out by a method of pressing a hot press to a friction member material, a method of heating with direct fire such as flame of a gas, a method of heating with a radiant heat such as far infrared rays, etc., and it is not specifically limited. With regard to the conditions for the scorch treatment, it may be selected and carried out by electing conditions depending on the materials to be used.

EXAMPLES

In the following, the present invention will be explained by referring to Examples.

Examples 1 to 5

By formulating the materials shown in Table 1, and mixing the same by a mixer with a rotation number of 3000 r/min for 4 minutes to obtain friction material compositions. Then, these friction material compositions were provisionally molded to a predetermined shape, inserting the green compact and a back mold in a mold, subjecting to molding under heating and pressure with the conditions of 140° C.±5° C. and 50 MPa for 10 minutes, and further subjecting to post-heating treatment at 230° C. for 5 hours, and polishing the same after cooling to obtain disc brake pads, respectively.

Comparative Examples 1 to 5

In the same manner as in Examples 1 to 5 except for changing the formulations thereof as shown in Table 2, disc brake pads were obtained.

TABLE 1

(unit: % by weight)

| Item | | Example 1 | Example 2 | Example 3 | Example 4 | Example 5 |
|---|---|---|---|---|---|---|
| Binder | Silicone-containing Phenol resin, RX2325C trade name, available from Mitsui Chemicals Inc. | 9 | 9 | 9 | 9 | 4 |
| | Phenol resin, HP-491UP, trade name, available from Hitachi Chemical Co., Ltd. | — | — | — | — | 5 |

TABLE 1-continued (unit: % by weight)

| | Item | Example 1 | Example 2 | Example 3 | Example 4 | Example 5 |
|---|---|---|---|---|---|---|
| Fibrous material | Aramid resin (Kevlar ® resin) available from Du Pont-Toray Co., Ltd. | 3 | 3 | 3 | 3 | 3 |
| | Potassium titanate resin | 7 | 7 | 7 | 7 | 7 |
| | Rock Wool | 7 | 7 | 7 | 7 | 7 |
| | Copper fiber | 17 | 17 | 17 | 17 | 17 |
| Inorganic friction regulator | Antimony trisulfide | 4 | 4 | 4 | 4 | 4 |
| | Graphite, G-70, trade name, available from K. K. Chuetsu Graphite Kogyosho | 6 | 6 | 6 | 6 | 6 |
| | Zircon sand | 8 | 8 | 8 | 8 | 8 |
| | Barium sulfate | 18.5 | 14 | 18 | 23 | 18.5 |
| | Mica | 7 | 7 | 7 | 7 | 7 |
| | α alumina powder, available from Showa Denko K. K., maximum particle size: 50 μm or less | 0.5 | 0.5 | 1 | 0.1 | 0.5 |
| | γ alumina powder, available from Mizusawa Chemical Industries, Ltd. maximum grain size: 150 μm or less | 5 | 9.5 | 5 | 0.9 | 5 |
| Organic friction regulator | Cashew Dust, H101, trade name, available from Cashew K. K. | 5 | 5 | 5 | 5 | 5 |
| | Rubber powder, NBR powder | 3 | 3 | 3 | 3 | 3 |

TABLE 2

(unit: % by weight)

| | Item | Comparative example 1 | Comparative example 2 | Comparative example 3 | Comparative example 4 | Comparative example 5 | Reference example 1 | Reference example 2 |
|---|---|---|---|---|---|---|---|---|
| Binder | Silicone-containing Phenol resin, RX2325C trade name, available from Mitsui Chemicals Inc. | — | — | 9 | 9 | — | 9 | 9 |
| | Phenol resin, HP-491UP, trade name, available from Hitachi Chemical Co., Ltd. | 9 | 9 | — | — | 9 | — | — |
| Fibrous material | Aramid resin (Kevlar ® resin) available from Du Pont-Toray Co., Ltd. | 3 | 3 | 3 | 3 | 3 | 3 | 3 |
| | Potassium titanate resin | 7 | 7 | 7 | 7 | 7 | 7 | 7 |
| | Rock Wool | 7 | 7 | 7 | 7 | 7 | 7 | 7 |
| | Copper fiber | 17 | 17 | 17 | 17 | 17 | 17 | 17 |
| Inorganic friction regulator | Antimony trisulfide | 4 | 4 | 4 | 4 | 4 | 4 | 4 |
| | Graphite, G-70, trade name, available from K. K. Chuetsu Graphite Kogyosho | 6 | 6 | 6 | 6 | 6 | 6 | 6 |
| | Zircon sand | 8 | 8 | 8 | 8 | 8 | 8 | 8 |
| | Barium sulfate | 23.1 | 13 | 19 | 15.8 | 18.5 | 23.1 | 13 |
| | Mica | 7 | 7 | 7 | 7 | 7 | 7 | 7 |
| | α alumina powder, available from Showa Denko K. K., maximum particle size: 50 μm or less | 0.1 | 1 | 1 | 0.2 | 0.5 | 0.1 | 1 |
| | γ alumina powder, available from Mizusawa Chemical Industries, Ltd. maximum grain size: 150 μm or less | 0.8 | 10 | 4 | 8 | 5 | 0.8 | 10 |
| Organic friction regulator | Cashew Dust, H101, trade name, available from Cashew K. K. | 5 | 5 | 5 | 5 | 5 | 5 | 5 |
| | Rubber powder, NBR powder | 3 | 3 | 3 | 3 | 3 | 3 | 3 |

Next, with regard to the disk brake pads (friction materials) of the present invention and those of Comparative examples, effectiveness, μ build up and cold squeal noise were measured. The results are shown in Table 3. Incidentally, the test conditions are as mentioned below.

(1) Effectiveness and Cold Squeal Noise

A dynamo test was carried out according to a car brake apparatus dynamo meter testing method by JASO C406-87, and an average μ under usual conditions (50 km/h, 0.3 G), an average μ under high speed and high speed-reducing conditions (180 km/h, 0.6 G), and a minimum μ at the first fading test were compared to each other.

Moreover, after completion of the test by JASO C406-87, the test machine was allowed to stand under the conditions at 5° C. and 40% RH (relative humidity), and after allowing to stand, braking test was carried out for 15 times under low speed and low speed-reducing conditions (20 km/h, 0.2 G). An increased amount of μ after allowing to stand was obtained from the difference between μ at the first time braking and μ under the usual conditions (50 km/h, 0.3 G), and further frequency of occurrence of cold squeal noise was compared to each other.

(2) μ Build Up

An actual test was carried out by using a FF car (class of 2500 cc displacement) manufactured by Nissan Motor Co., Ltd. In a braking test with a constant pedaling power aiming at a car speed of 50 km/h and an initial speed-reducing rate of 0.2 G, an amount of the μ build up was measured from increase in speed-reducing rate relative to the braking time. At this time, an amount of the μ build up from a car speed of 50 km/h to 20 km/h and an amount of the μ build up from a car speed of 20 km/h to 0 km/h were calculated.

TABLE 3

Dynamo test results

|  | Usual effectiveness level (50 km/h, 0.3 G) (average μ value) | High speed effectiveness level (180 km/h, 0.6 G) (average μ value) | High temp. effectiveness level (First time fading) (Lowest value of average μ) | Effectiveness level after allowing to stand (20 km/h, 0.2 G) (Average μ value at first time braking) | Cold squeal noise (Frequency of causing squeal noise) (%) | Actual car test results | |
|---|---|---|---|---|---|---|---|
|  |  |  |  |  |  | μ build up (50→20 km/h) (increased amount of μ) | μ build up (20→0 km/h) (increased amount of μ) |
| Example 1 | 0.46 | 0.43 | 0.41 | 0.56 | 0 | 0.026 | 0.014 |
| Example 2 | 0.49 | 0.45 | 0.43 | 0.54 | 0 | 0.022 | 0.012 |
| Example 3 | 0.49 | 0.43 | 0.40 | 0.57 | 0 | 0.035 | 0.026 |
| Example 4 | 0.45 | 0.40 | 0.38 | 0.58 | 0 | 0.018 | 0.005 |
| Example 5 | 0.47 | 0.42 | 0.40 | 0.59 | 6.7 | 0.022 | 0.013 |
| Comparative example 1 | 0.45 | 0.37 | 0.35 | 0.68 | 26.7 | 0.017 | 0.006 |
| Comparative example 2 | 0.50 | 0.45 | 0.42 | 0.64 | 53.3 | 0.043 | 0.029 |
| Comparative example 3 | 0.48 | 0.42 | 0.40 | 0.56 | 0 | 0.032 | 0.040 |
| Comparative example 4 | 0.47 | 0.44 | 0.43 | 0.55 | 0 | 0.009 | 0.007 |
| Comparative example 5 | 0.46 | 0.42 | 0.40 | 0.68 | 66.7 | 0.020 | 0.010 |
| Reference example 1 | 0.45 | 0.38 | 0.36 | 0.59 | 6.7 | 0.017 | 0.006 |
| Reference example 2 | 0.50 | 0.45 | 0.42 | 0.61 | 33.3 | 0.043 | 0.029 |

The judgment standard in Table 3 is as follows:

An average friction coefficient under high speed and high speed-reducing conditions (180 km/h, 0.6 G), the lowest friction coefficient at the time of first fading test and the amount of the μ build up from a car speed from 50 km/h to 20 km/h in an actual car test mean that a larger numerical value is good, and the numerals of the amount of the μ build up with a car speed from 20 km/h to 0 km/h, an increased amount of the μ after allowing to stand and frequency of occurrence of cold squeal noise show that a smaller number means good.

Incidentally, the frequency of occurrence of cold squeal noise was obtained by the following equation.

Frequency of occurrence of cold squeal noise (%)={(Number of occurrence of squeal noise)/(Number of braking)}×100

As shown in Table 3, it would be clear that the disc brake pads of Examples according to the present invention are high in effectiveness under the high speed and high speed-reducing conditions (180 km/h, 0.6 G) and fading conditions. Also, it would be clear that the amount of the μ build up with a car speed from 20 km/h to 0 km/h is repressed to a lower value than the amount of the μ build up with a car speed from 50 km/h to 20 km/h, increase in the friction coefficient under the low speed and the low speed-reducing conditions (20 km/h, 0.2 G) after allowing to stand is a little and frequency of occurrence of cold squeal noise is low.

To the contrary, in the disc brake pad of Comparative example 1, effectiveness under the high speed and high speed-reducing conditions (180 km/h, 0.6 G) and fading conditions are low, and increase in the friction coefficient under the low speed and the low speed-reducing conditions (20 km/h, 0.2 G) after allowing to stand is large. In the disc brake pads of Comparative examples 2 and 5, increase in the friction coefficient under the low speed and the low speed-reducing conditions (20 km/h, 0.2 G) after allowing to stand is large. In the disc brake pad of Comparative example 3, the amount of the μ build up with a car speed from 20 km/h to 0 km/h is larger than the amount of the μ build up with a car speed from 50 km/h to 20 km/h, so that groan noise or squeal noise is likely caused. Moreover, in the disc brake pad of Comparative example 4, there is a problem that the amount of the μ build up with a car speed from 50 km/h to 20 km/h was insufficient.

Incidentally, in the disc brake pad of Reference example 1 in which α alumina and γ alumina were contained in an amount of 0.9% by weight based on the total amount of the whole composition, it showed a slightly lower effectiveness under the high speed and high speed-reducing conditions (180 km/h, 0.6 G) and fading conditions as compared with the disc brake pads of Examples of the present invention, but are higher than those of Comparative example 1. Also, in the disc brake pad of Reference example 1 in which α alumina and γ alumina were contained in an amount of 11% by weight based on the total amount of the whole composition, it showed a slightly larger increase in the friction coefficient under the low speed and the low speed-reducing conditions (20 km/h, 0.2 G) after allowing to stand as compared with the disc brake pads of Examples of the present invention, but is lower than that of Comparative example 2.

The friction material composition according to the present invention is a little in lowering of effectiveness under high load, high speed, high temperature, etc., excellent in stability of μ, fading resistance and μ build up, causing less occurrence of cold squeal noise by controlling increase in μ after allowing a car for a long time, and suitable for a friction material.

The friction material composition according to the present invention is particularly excellent in stability of μ, fading resistance and μ build up, and suitable for a friction material, among the above composition.

The fiction materials according to the present invention are excellent in stability of μ, fading resistance and μ build up, and causing less occurrence of cold squeal noise, so that they are extremely suitable for industry.

The invention claimed is:

1. A friction material composition which comprises a fibrous material except for asbestos, an inorganic friction regulator, an organic friction regulator and a binder, part of the inorganic friction regulator is α alumina and γ alumina in combination, a weight ratio of the α alumina and the γ alumina, α alumina:γ alumina, is in the range of 1:20 to 1:5, and part or whole part of the binder is a silicone-containing phenol resin.

2. The friction material composition according to claim 1, wherein a total amount of the α alumina and the γ alumina is 1 to 10% by weight based on the whole content of the friction material composition.

3. A friction material which is obtained by molding the friction material composition according to claim 1 under heating and pressure.

4. A friction material which is obtained by molding the friction material composition according to claim 2 under heating and pressure.

5. The friction material according to claim 3, wherein the friction material is a disc brake pad or brake linings.

6. The friction material composition according to claim 1, wherein the weight ratio of the α alumina and the γ alumina is in the range of 1:17 to 1:8.

7. The friction material composition according to claim 1, wherein the weight ratio of the α alumina and the γ alumina is in the range of 1:15 to 1:10.

8. The friction material composition according to claim 2, wherein the total amount of the α alumina and the γ alumina is 2 to 9% by weight based on the whole content of the friction material composition.

9. The friction material composition according to claim 2, wherein the total amount of the α alumina and the γ alumina is 3 to 8% by weight based on the whole content of the friction material composition.

10. The friction material composition according to claim 2, wherein the silicone-containing phenol resin is at least one phenol resin selected from the group consisting of a phenol resin in which silicone oil is dispersed, a phenol resin modified by silicone oil, and a phenol resin containing silicone rubber.

11. The friction material composition according to claim 2, wherein the silicone-containing phenol resin is contained in an amount of 2 to 15% by weight based on the whole content of the friction material composition.

12. The friction material composition according to claim 2, wherein the silicone-containing phenol resin is contained in an amount of 4 to 13% by weight based on the whole content of the friction material composition.

13. The friction material composition according to claim 1, wherein the fibrous material is contained in an amount of 5 to 40% by weight, the inorganic friction regulator is contained in an amount of 20 to 80% by weight, the organic friction regulator is contained in an amount of 2 to 25% by weight and the binder is contained in an amount of 2 to 15% by weight based on the whole content of the friction material composition.

14. The friction material composition according to claim 1, wherein the fibrous material is contained in an amount of 10 to 35% by weight, the inorganic friction regulator is contained in an amount of 30 to 70% by weight, the organic friction regulator is contained in an amount of 4 to 23% by weight and the binder is contained in an amount of 3 to 14% by weight based on the whole content of the friction material composition.

15. The friction material composition according to claim 1, wherein the fibrous material is contained in an amount of 15 to 30% by weight, the inorganic friction regulator is contained in an amount of 40 to 60% by weight, the organic friction regulator is contained in an amount of 6 to 21% by weight and the binder is contained in an amount of 4 to 13% by weight based on the whole content of the friction material composition.

16. The friction material according to claim 3, wherein the molding is carried out at a temperature of 130 to 170° C. and a pressure of 20 to 60 MPa.

17. The friction material according to claim 3, wherein the molding is carried out at a temperature of 140 to 160° C. and a pressure of 30 to 50 MPa.

18. The friction material composition according to claim 1, wherein the silicone-containing phenol resin includes a thermosetting phenol resin obtained by condensing a phenol derivative and an aldehyde derivative in the presence of an acid or an alkali.

* * * * *